United States Patent Office 3,824,138
Patented July 16, 1974

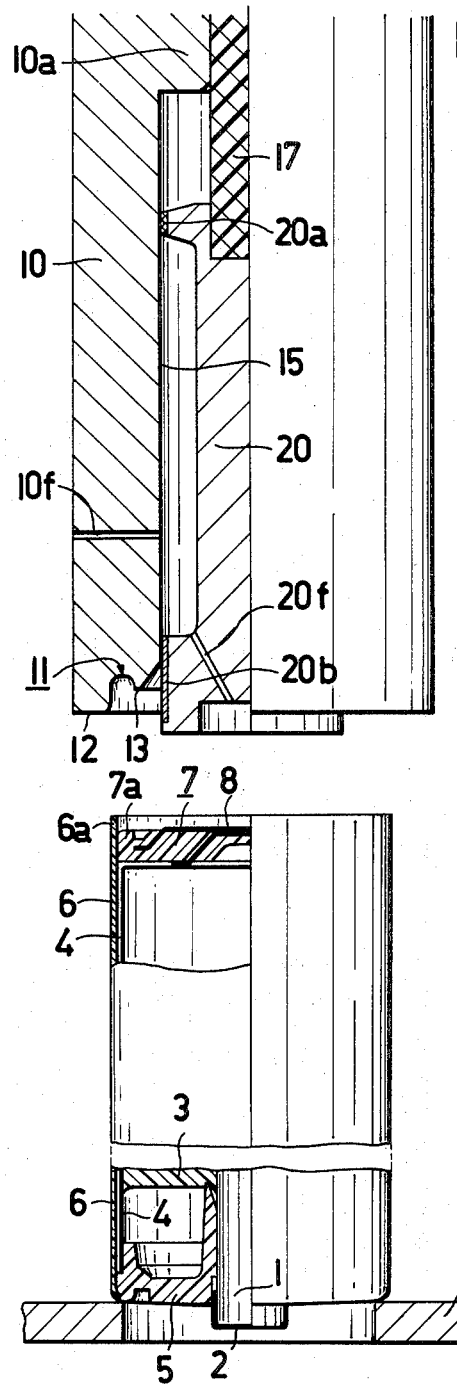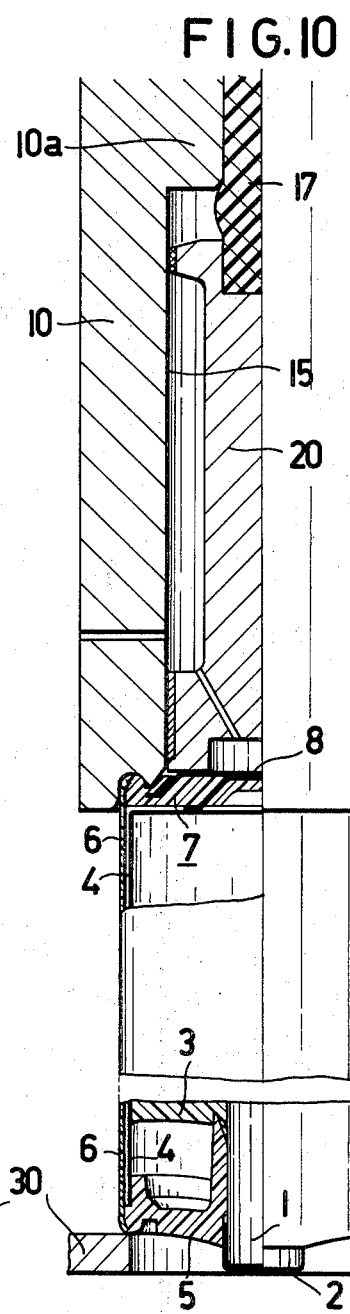

3,824,138
PROCESS AND APPARATUS FOR JOINING A TUBULAR THERMOPLASTIC CONTAINER JACKET, BY MEANS OF ULTRASONICS, TO A THERMOPLASTIC END CAP TO FORM A LIQUID-TIGHT SEAL
Ernst Karobath, Leopold Rippel, Hans Schmidinger, and Wolfgang Pulitzer, Vienna, Austria, assignors to Firma Telephon- und Telegraphen-Fabriks-Aktiengesellschaft Kapsch & Sohne, Wien, Austria
Filed Dec. 7, 1971, Ser. No. 205,583
Claims priority, application Austria, Dec. 10, 1970, A 11,131/70; Apr. 5, 1971, A 2,907/71
Int. Cl. B29c 27/08
U.S. Cl. 156—69
7 Claims

ABSTRACT OF THE DISCLOSURE

In a process and apparatus for joining a tubular thermoplastic container jacket, by means of ultrasonics, to a thermoplastic end cap to form a liquid-tight seal, the end cap is inserted into the jacket so that the jacket rim projects beyond the cap, and an axially-oscillating sonotrode is advanced axially against the jacket rim to soften the jacket rim and roll it inwardly over the rim of the cap. The softened jacket rim is trapped in an annular chamber formed between the sonotrode and the cap, and further advancement of the sonotrode applies welding pressure to the softened jacket rim.

---

The invention relates to a process and a device for joining liquid-tight a container jacket made of a thermoplastic material to a top or bottom cap, also made of a thermoplastic material, by means of ultrasonic oscillations. The invention is intended more particularly for use in the manufacture of liquid-tight jackets for galvanic primary cells or capacitors, particularly electrolytic capacitors. In these cases the container jacket is bonded liquid-tight to a top car and/or a bottom cap made of a thermoplastic material and containing a firmly embedded electric contact piece or connection.

Compared to other methods of welding, the welding of plastics by means of ultrasonic oscillations has the great advantage that the welding process takes place more rapidly because heat is applied directly to the welding zone by friction. Consequently, in the first place, there is no time-consuming conduction of heat and secondly as soon as the desired welding temperature is reached in the welding zone the heating process can immediately be interrupted.

Hitherto, in the manufacture of containers made of synthetic thermoplastic materials by welding a bottom cap to the container jacket by ultrasonic oscillation, the parts have been joined together by a butt weld. By this method the container jacket is mounted on the bottom cap and ultrasonic power is applied through the bottom cap to the abutting surfaces by means of a sonotrode. This method encounters difficulties in particular when welding thin-walled container jackets, such as are used in the manufacture of liquid-tight containers for primary galvanic cells, electrolytic capacitors and the like. Due to the manufacturing tolerances of the plastic parts and the low strength of the thin-walled container jacket it is difficult, by this method, to position the two plastic parts accurately enough relative to each other to ensure that a good butt weld is made, and to hold the parts accurately positioned during the welding.

Further difficulties arise if the container jacket and the top or bottom cap are made of a fairly soft thermoplastic material which does not conduct the ultrasonic energy well, or if the two plastic parts are made of materials which have different melting points. Under these circumstances the existing state of the art does not allow a satisfactory welded joint to be obtained. The ultrasonic energy first melts the directly energised thin container jacket, or the plastic part which has the lower melting point. Subsequently when the welding pressure is applied the molten plastic is expelled from the welding zone.

In the present invention these disadvantages are substantially overcome by making an overlap weld, without substantially involving more expensive tools or increased working time.

According to the invention, in a process in which a container jacket, made of a synthetic thermoplastic material, is welded to a top or bottom cap, also made of a synthetic thermoplastic material, by means of ultrasonic oscillation, so as to form a tight seal, the cap is thrust into the open end of the tubular container jacket until the jacket rim projects beyond the cap, whereupon an axially oscillating sonotrode, arranged to function as a combined rolling-over and welding tool, is advanced axially against the projecting jacket rim, softening it and rolling it radially inwards over the rim of the cap, which is supported from the opposite side, the softened rim becoming trapped during this movement in an annular closed chamber formed at least partly by the sonotrode and the cap, whereupon the sonotrode, advancing further, reduces the volume of the chamber, applying a welding pressure to the softened plastic material of the jacket rim.

By this method the part of the jacket wall which projects beyond the top or bottom cap is first of all softened by the oscillating sonotrode only enough to allow it to be rolled over the rim of the cap without folding or creasing. Subsequently the rolled over projecting rim of the container jacket is brought, by further downward movement of the sonotrode, into firm contact with the surface of the cap rim, the cap being supported from the opposite direction. In the next phase of the operation the sonotrode, oscillating in directions perpendicular to the rolled over jacket rim, rapidly heats the plastic material by friction, plasticizing it sufficiently so that the overlapping plastic parts are melted together.

In this process it is desirable to prevent the molten plastic of the jacket rim and cap from being expelled radially inwards from the welding zone over the visible surface of the cap, where it would make the cell unsightly or even unsalable. To prevent this the entire welding zone is enclosed, in the process according to the invention, in an annular chamber, by means of the sonotrode.

The term "annular chamber" is used to mean a chamber which follows a closed path, not necessarily circular, for example the circular or polygonal periphery of the container jacket. The softened or molten plastic of the jacket rim is enclosed and contained by the annular chamber. This not only prevents the molten plastic from being expelled from the welding zone, but also allows the sonotrode to put the molten plastic under pressure. The plastic is therefore heated by ultrasonic oscillation while under pressure, so that a good weld seam is made, as will be described further below. After the welding has been completed the ultrasonic oscillations of the sonotrode are interrupted, the sonotrode remaining however in place for a further brief period, to give the weld time to harden.

Within the frame of the invention the sonotrode must therefore roll the projecting rim of the container jacket over the rim of the top or bottom cap, and must then trap the softened and partly melted plastic material of the jacket rim in an annular closed chamber. A sonotrode capable of performing these operations and therefore suitable for performing the process according to the invention is characterised in that the working end of the sonotrode is in the form of a hollow cylinder whose working face contains an annular recess formed by a hollow cylindrical outer wall whose internal diameter is approximately the external diameter of the container jacket, the outer wall merging by a curvature into a thrust wall, essentially perpendicular to the hollow cylinder axis, the thrust wall merging by a curvature into a cylindrical inner wall.

In a sonotrode of this construction the working surfaces of the cylindrical outer and inner walls of the annular recess in the sonotrode are parallel to the directions of ultrasonic oscillation and consequently these surfaces convert practically no ultrasonic energy into heat. The production of heat is limited to the sonotrode surface which extends perpendicular to the axis of the hollow sonotrode cylinder, that is to say the bottom surface of the annular recess in the sonotrode. This surface forms the upper surface of the welding zone.

If necessary a hold-down can be used for holding the plastic parts in their correct relative positions before and during the welding process. The hold-down can also serve to form, with the sonotrode and the cap, an annular hollow chamber for containing the softened and molten plastic, so that the molten plastic cannot exude radially inwards over the visible surface of the cap. When the process according to the invention is used for sealing the container jacket of a primary cell to top and bottom caps each of which contains an imbedded electric contact piece, the hold-down can be used, as will be described further below, to produce operating conditions which ensure that in the finished cell the electric contact pieces constantly make good electric contact with the poles of the cell.

The invention will now be described in greater detail on the basis of the several examples represented in the drawing, with reference in particular to the manufacture of liquid-tight containers for primary galvanic cells, using for constructing the container a tubular jacket together with a top cap or a bottom cap in which an electric contact piece has previously been embedded.

Figure 1:
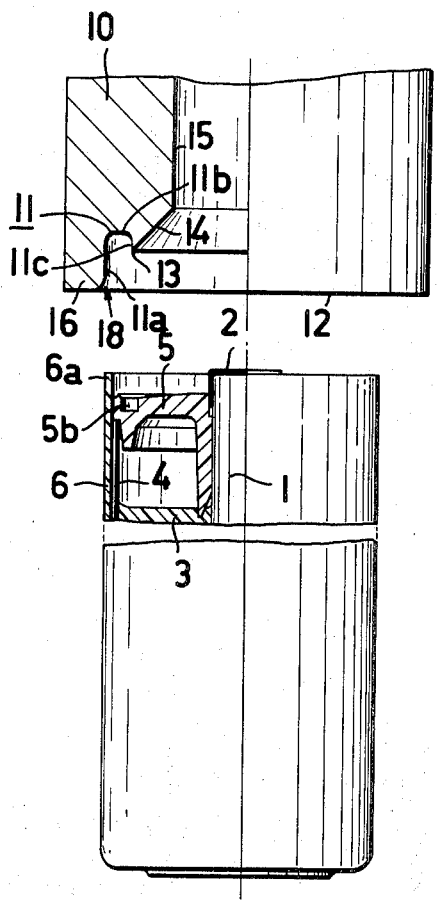
FIG. 1 is a longitudinal section through the left hand half of the upper part of a primary galvanic cell, with a tubular jacket and an inserted top cap containing an embedded electric contact piece, the figure also showing a section through the lower part of a sonotrode, that is to say an ultrasonic working tool, for welding the tubular jacket to the top cap.
Figure 2:
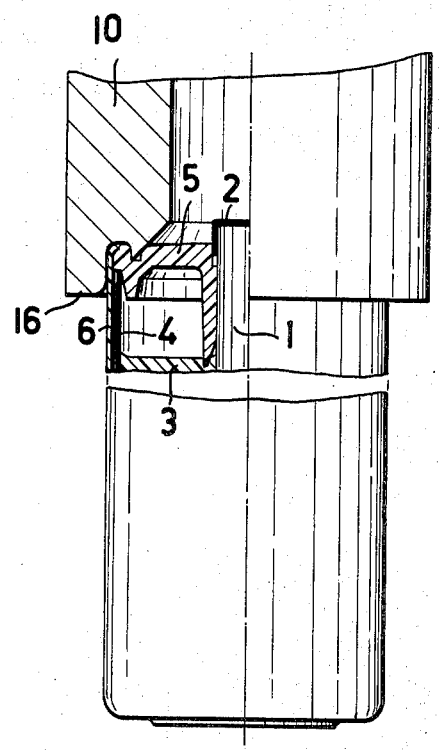
FIG. 2 shows the same parts in the positions they occupy when the weld has been made.
Figure 3:
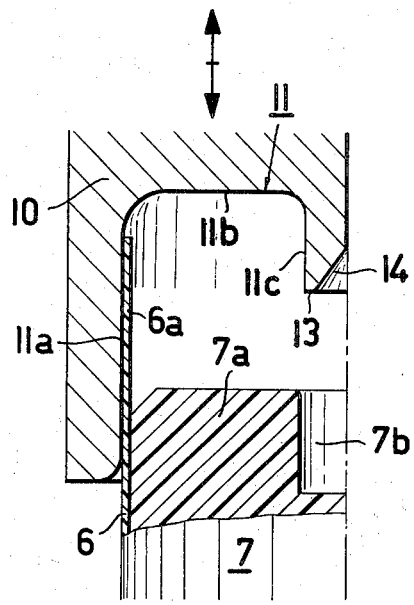
FIGS. 3 to 6 show, on a larger scale, a sonotrode arranged according to the invention as a combined edge-rolling and welding tool, the tool being shown in four successive positions relative to a primary galvanic cell during the process of welding the tubular jacket of the cell to a bottom cap containing an embedded electric contact piece.
Figure 4:
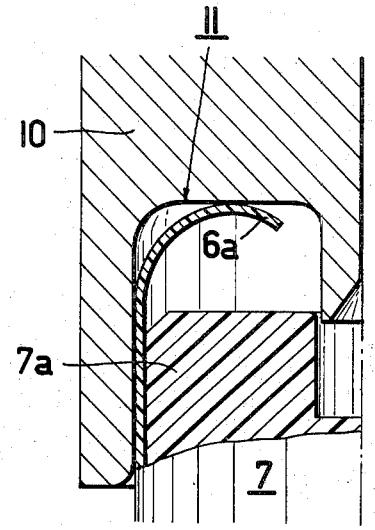
Figure 5:
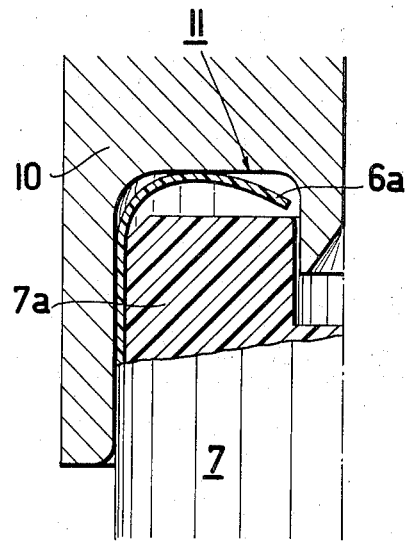
Figure 7:
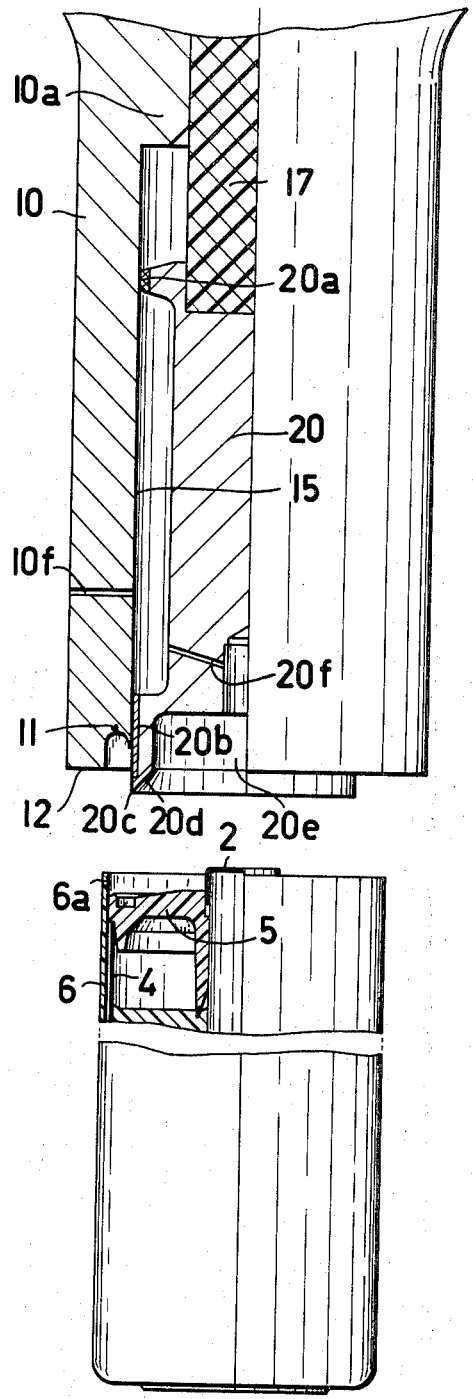
Figure 8:
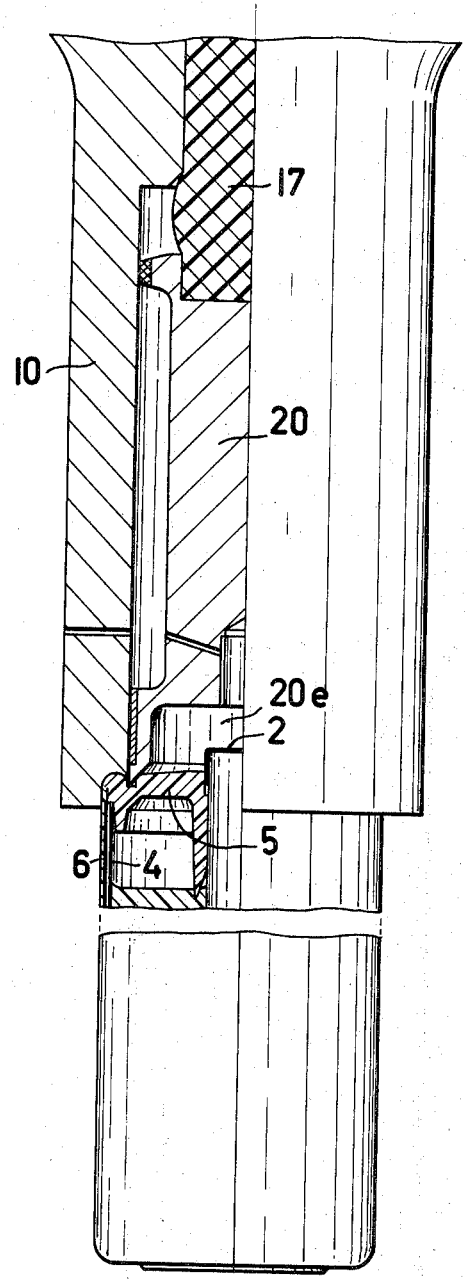

FIGS. 7 and 8 show another example of the invention, in the form of a development of the version shown in FIGS. 1 and 2. In FIG. 7 the tool is shown before the beginning of the welding operation, whereas FIG. 8 shows the tool in position during or after the welding. In this case the sonotrode is equipped with a hold-down, which has two functions. In the first place the hold-down serves for holding down the top cap. The hold-down however also serves for forming a hollow chamber which encloses the welding zone.

Similarly FIGS. 9 and 10 show an example in the form of a further development of the version shown in FIGS. 3 to 6. In this case the hold-down is arranged to ensure a good contact, in the finished primary galvanic cell, between the poles of the cell and the electric contact pieces embedded in the top and bottom caps.

FIGS. 1 and 2 show a plus-pole 1 (carbon rod), an electric contact piece 2, the cast composition 3 and the minus-pole (zinc pot) 4 of the primary galvanic cell. A liquid-tight container is to be formed by welding a tubular jacket 6 to a top cap 5 made of a thermoplastic material. The electric contact piece 2 is in the form of a cap firmly fixed on top of the carbon rod 1, which is itself inserted liquid-tight through a central supporting projection of the top cap 5, the lower end of the central projection being embedded in the cast composition 3. Analogously, as shown in FIGS. 9 and 10, a bottom cap containing an embedded electric contact piece can be joined liquid-tight by the process according to the invention to a tubular jacket made of a thermoplastic material of construction. The sonotrode shown in FIGS. 9 and 10 will be described further below.

In order to obtain an overlap weld the top cap 5, as shown in FIG. 1, is pushed down into the tubular jacket 6 far enough so that the upper rim 6a of the tubular jacket projects upwards a certain distance beyond the edge of the top cap. When this has been done the primary galvanic cell is mounted correctly positioned under the sonotrode 10, which is arranged to move vertically up and down. The sonotrode 10 is lowered, the ultrasonic generator being switched on. FIG. 1 shows only the lower part of the sonotrode 10, which is in the form of a hollow cylinder. The sonotrode 10 contains an annular recess 11 limited in the radially outward direction by a cylindrical outer wall 11a which is perpendicular to the lower face 12 of the sonotrode. The diameter of the cylindrical outer wall 11a is the external diameter of the tubular jacket 6. The cylindrical outer wall 11a merges in a gradual curvature with a thrust wall 11b whose surface is essentially perpendicular to the axis of the hollow cylindrical sonotrode.

When the oscillating sonotrode is lowered, the projecting upper rim 6a of the tubular jacket 6 penetrates into the annular recess 11 where it is subjected to ultrasonic oscillations, which soften the material of the projecting upper rim 6a. Further downward movement of the sonotrode 10 bends the softened upper rim inwards over the outer rim of the top cap 5, without folding or creasing the softened upper rim 6a. The ultrasonic oscillations produce friction between the contacting surfaces of the softened rim 6a and the rim of the top cap 5, melting the plastic and welding the two parts together, as represented in FIG. 2.

In this example of the invention the top cap 5 has an annular channel 5b for receiving molten plastic expelled radially inwards from the welding zone. If this molten plastic were to overflow onto the visible surface of the top cap, the result would be unsightly. The annular recess 11 has an inner wall 11c which merges in a curvature with the thrust wall 11b, which itself extends essentially perpendicular to the sonotrode axis. The lower edge of the inner wall 11c terminates in an annular projecting edge 13, this edge being common to the inner wall 11c and an internal conical surface 14 which is continued upwards by the internal surface 15 of the hollow cylindrical sonotrode 10.

When the sonotrode is lowered, the annular projecting edge 13 enters into the annular channel 5b in the top cap 5, the internal conical surface 14 engaging to make firm contact with the inner edge of the annular channel, if necessary slightly deforming this edge, so that a good seal is formed, enclosing the welding zone in an annular chamber so that no molten plastic can penetrate radially inwards onto the visible surface of the top cap 5. Consequently excess molten plastic comes to form a "weld seam" which is retained within the annular channel 5b, ensuring that the finished product is of good appearance.

As shown in FIGS. 1 and 2, the outer edge of the sonotrode is extended downwards in the form of a skirt 16, which can have a conical or rounded mouth 18 to facilitate entry of the projecting upper rim 6a of the tubular jacket into the annular recess 11 when the sonotrode is lowered. The skirt 16 of the sonotrode supports the jacket 6 radially during the welding process. The skirt 16 also forms, with the upper part of the tubular jacket 6, an outer seal for the annular chamber which retains the molten plastic, preventing the upper part of the tubular jacket from suffering permanent deformation under the pressure applied by the sonotrode. It is of course assumed, in regard to all the examples hitherto described, that the cell is supported in position under the sonotrode in such a way that the cell is able to withstand the welding pressure.

FIGS. 3 to 6 show, drawn to a larger scale, an ultrasonic welding tool somewhat similar to that represented in FIGS. 1 and 2. The tool is shown in four successive positions relative to the parts which are to be welded together. It is assumed, in this example, that a bottom cap 7, made of a low pressure polyethylene and containing an embedded electric contact piece, is to be welded to the projecting lower rim 6a of a tubular jacket 6 made of a high pressure polyethylene, in the manufacture of the liquid-tight container of a primary galvanic cell. The projecting lower rim 6a is to be overlap welded to the raised edge 7a of the bottom cap 7. If desired there can be an annular channel 7b radially inwards of the raised edge 7a.

The end face of a hollow cylindrical sonotrode 10, of which only the lower part is shown, contains as already described an annular recess 11 which has three walls, a hollow cylindrical outer wall 11a, whose diameter is the external diameter of the tubular jacket 6, a thrust wall 11b essentially perpendicular to the axis of the sonotrode and a cylindrical inner wall 11c, coaxial with the cylindrical outer wall 11a. The three walls merge into each other on curvatures. The lower edge of the inner wall 11c terminates in an annular projecting edge 13, this edge being common to the inner wall 11c and an internal conical surface 14. The edge 13 can be a blunt edge.

Figure 6:
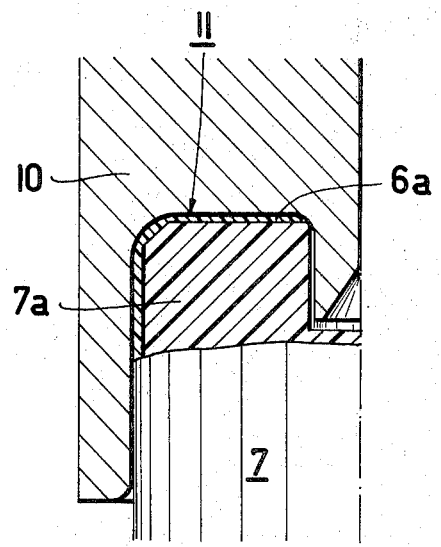

The annular recess 11 has a width approximately equal to that of the raised edge 7 of the bottom cap, plus the thickness of the tubular jacket 6. Consequently when the sonotrode 10, oscillating in the directions of the double arrow P, has moved downwards from the position shown in FIG. 3 into the position shown in FIG. 4, the annular recess 11 is just wide enough to accommodate the raised edge 7a of the bottom cap, plus the upper part of the tubular jacket 6. During the downward movement of the oscillating sonotrode 10 the projecting lower rim 6a of the tubular jacket 6 is rolled over, that is to say rolled inwards and downwards towards the surface of the bottom cap 7. With further downward movement of the sonotrode 10, into the position shown in FIG. 5, the projecting rim 6a progressively softens under the influence of the ultrasonic oscillation, finally partly melting. When the sonotrode 10 has reached its welding position, as shown in FIG. 6, the annular space between the wall of the recess 11 and the surface of the raised edge 7a of the bottom cap 7 is entirely filled with partly molten high pressure polyethylene, the weld being completed by the pressure applied by the sonotrode to the partly softened and partly melted plastic trapped in the gap.

It should be observed that the sonotrode, oscillating in the direction of the double arrow P, that is to say parallel to the outer and inner walls 11a and 11c of the annular recess 11, applies neither welding pressure nor ultrasonic power through these walls. The thrust wall 11b, on the other hand, which extends essentially perpendicular to the directions of oscillation fully applies ultrasonic power and welding pressure to the plastic in the welding zone, as shown in FIG. 6. At the curved transition surfaces, between the three walls 11a, 11b and 11c of the annular recess the application of ultrasonic energy and welding pressure varies all the way from the maximal value down to zero. This allows the process conditions to be chosen so that the material of the rim 6a is melted only under the thrust wall 11b, the material on either side of this region being merely softened. The soft or doughy plastic has no tendency to escape between the walls of the annular recess 11 and the raised edge 7a of the bottom plate, these parts together forming a 2-piece mould. A clean weld seam is therefore ensured.

In the region under the thrust wall 11b, where ultrasonic power and welding pressure are applied to the highest degree and where consequently the highest temperature is obtained, the high pressure polyethylene of the jacket rim 6a melts, softening the low pressure polyethylene of the raised edge 7a of the bottom cap 7, the hammering action of the oscillating sonotrode producing a compelled exchange of molecular positions, resulting in a strong weld.

The process described above, using the sonotrode described, allows very short working times to be obtained, of the order of one second, depending on the materials which have to be welded, including the rolling over, the welding and the period required for the weld to harden. The sonotrode is preferably energised with ultrasonic energy before it starts moving downwards, or during its downward movement, so that the sonotrode is already oscillating when it slides downwards over the outer surface of the projecting rim of the tubular jacket. The ultrasonic oscillation is continued until the welding process has been completed. At the end of the welding process the ultrasonic oscillation is interrupted, the sonotrode remaining however in place for a further short period, to allow the weld to harden.

FIGS. 7 and 8 show a further example of the invention. The sonotrode is essentially similar to that shown in FIGS. 1 and 2, but contains a hold-down 20 in the form of a plunger. The principal function of the hold-down is to thrust the cap 5 downwards in the tubular jacket 6, before the beginning of the welding operation, to ensure that the cap is in the correct position relative to the tubular jacket. The hold-down 20, which is arranged to slide up and down in the sonotrode cylinder, is attached to the part 10a of the sonotrode cylinder by means of a resilient connector 17 made for example of rubber. The region 10a of the sonotrode tube is preferably at the location of an oscillation node, for example the distance between the region 10a and the lower face 12 of the sonotrode can be a quarter of a wavelength. Consequently practically no oscillations are transmitted to the hold-down 20. The hold-down 20 is guided to slide up and down over the inner surface 15 of the sonotrode cylinder by an annular collar 20a and a further collar 20b near the lower end of the hold-down, an antifriction material being interposed between the surfaces to facilitate sliding, that is to say the material has a low coefficient of friction in contact with the inner wall of the sonotrode. For example the main body of the hold-down 20 can be of steel, the collars 20a and 20b being made of Teflon. This material has the fuurther advantage that only a little oscillation is transmitted from the sonotrode 10 to the hold-down 20 through the supporting guides 20a, 20b.

In the lower face of the hold-down there is a clearance recess 20e into which cap fittings, for example a projecting electric contact cap 2, can enter unimpeded. The lower end of the hold-down 20 has an annular edge 20c which is concentric to the inner surface 15 of the cylindrical sonotrode 10. Between the clearance recess 20e and the annular edge 20c there is an internal conical surface 20d.

When the sonotrode is lowered into the position shown in FIG. 8, the hold-down 20 first comes into contact with the cap 5, the annular edge 20c of the hold-down penetrating into the annular channel 5b of the cap 5. The internal conical surface 20e thrusts firmly against the inner edge of the channel 5b, if necessary slightly deforming the material of the cap, so that a tight seal is formed, enclosing the welding zone in an annular chamber. With further lowering of the sonotrode the resilient connector 17 is deformed and resiliently applies a downward thrust to the hold-down 20. The downward thrust of the sonotrode bends the projecting edge 6a of the tubular jacket 6 inwards, thrusting it firmly against the surface of the edge of the cap 5, whereupon the welding is effected. After a brief period to allow the weld to harden, the sonotrode 10 is raised, the flexible connecter 17 resiliently returning the hold-down to its initial position relative to the sonotrode, as shown in FIG. 7. Air vents 20f in the wall of the hold-down and 10f in the wall of the sonotrode can be provided for preventing disturbing oscillations in the air trapped in the chambers.

In those cases where it is desired to use the process according to the invention in the manufacture of primary galvanic cells of the kind in which both the top cap and the bottom cap have embedded electric contact pieces, it is important to ensure that each contact piece makes good contact with the relevant pole of the primary cell. This is obtained according to the invention as follows. Both before and during the welding process the cap (top or bottom cap) which is already welded to the tubular jacket is deformed in such a way that after the other cap, that is to say the second cap, has been welded, and the welding pressure has been released, the elastic rebound of the first cap thrusts the electric contact pieces into firm contact with the cell poles.

In the example shown in FIGS. 9 and 10, which is a further development of the version of FIGS. 3 to 6, the top cap 5 is elastically deformable. In order to join the bottom cap 7 to the tubular jacket 6, the cell is mounted upside down on a supporting ring 30, which supports the cell only at its rim. When a downward thrust is applied to the bottom cap 7 containing an embedded electric contact piece 8, which must make good contact with the bottom of the zinc pot 4, the top cap 5 is elastically deformed downwards, as shown in FIG. 10.

When the sonotrode moves downwards towards the position shown in FIG. 10, the hold-down 20 first pushes the bottom cap 7 deeper into the open end of the tubular jacket 6, the applied thrust deforming the top cap 5 downwards. After the projecting rim 6a of the tubular jacket 6 has been bent inwards and over by the walls of the annular recess 11 in the sonotrode, the projecting rim 6a is welded to the bottom cap 7. When the weld has been completed and has hardened, the sonotrode 10 is raised, the hold-down 20 returning to its initial position in the sonotrode 10 under the influence of the resilient connector 17. The deformed top cap 5, returning elastically towards its initial shape, holds the electric contacts firmly in engagement.

Instead of the hold-down mounted resiliently in the sonotrode cylinder, as represented in the figures, there can if desired be used a hold-down actuated independently of the sonotrode, for example a hydraulically or pneumatically actuated hold-down working in an axial bore in the sonotrode.

The examples described can of course be modified in various ways without leaving the frame of the invention. Furthermore the field of application of the invention can be extended, in particular to include the forming of tight container seals in the manufacture of capacitors. In regard to materials of construction for the tubular jacket, polypropylene and polyethylene are examples of suitable materials. The tubular jacket and the top and bottom caps can if desired be made of the same material. The process according to the invention is however particularly advantageous if the material of the tubular jacket has a lower melting point than the material of the top and bottom caps. For the tubular jacket a particular suitable material is high pressure polyethylene and low pressure polyethylene for the two caps.

We claim:
1. A process for joining a projecting end portion of a thermoplastic jacket to a thermoplastic cap located within the jacket, by means of a welding and beading ultrasonic tool having a recess arranged in a welding plane perpendicular to the direction of ultrasonic vibrations of said tool, said recess defining an outer side wall adapted to be in contact with the outer surface of said end portion, a bottom part defining an active welding zone, and an inner side wall, comprising the steps of inserting said cap into said jacket at a distance from the rim of the end portion thereof, placing the rim of said end portion in contact with said bottom part of said recess, advancing said ultrasonic tool in axial direction, while axially oscillating said tool, thereby progressively softening said end portion and simultaneously bending it inwardly over the cap and, during this movement, trapping the softened end portion in the closed space resulting between the side walls of said recess and said cap, further reducing the volume of said closed space by advancing said tool towards said cap until said end portion is welded to the adjacent part of said cap.

2. A process according to claim 1, in which said ultrasonic tool is a sonotrode.

3. A process according to Claim 2, in which radially inwards of its rim the cap has an annular channel for receiving excess molten plastic, the channel being sealed axially, to prevent escape of molten plastic, by the sonotrode and/or by means cooperating therewith.

4. A process according to Claim 2, in which the cap has a raised edge, and the projecting rim of the tubular jacket is rolled over the raised cap edge by the action of an annular recess in the working face of the sonotrode, the annular recess and the raised cap edge together forming an annular chamber which contains the projecting jacket rim.

5. A process according to Claim 4, in which the raised cap edge is terminated radially inwards by an annular channel which separates the raised cap edge from the remainder of the cap.

6. A process according to Claim 2, in which after the welding has been completed the axial oscillation of the sonotrode is interrupted, and the sonotrode is retained in place long enough to allow the weld to harden.

7. A process according to Claim 1, in which a tubular container jacket made of a high pressure polyethylene is welded to a top or bottom cap made of a low pressure polyethylene.

References Cited

UNITED STATES PATENTS

| | | | |
|---|---|---|---|
| 3,544,386 | 12/1970 | Musil | 136—175 |
| 2,678,471 | 5/1954 | Barton | 156—69 |
| 3,623,926 | 11/1971 | Sager | 156—73 |
| 2,922,832 | 1/1960 | Gottschall et al. | 136—175 |

CHARLES E. VAN HORN, Primary Examiner

F. FRISENDA, JR., Assistant Examiner

U.S. Cl. X.R.

136—175; 156—73, 198, 272, 293